United States Patent [19]

Momiyama et al.

[11] Patent Number: 5,145,466
[45] Date of Patent: Sep. 8, 1992

[54] LIMITED SLIP DIFFERENTIAL AND POWER DEVICE

[75] Inventors: Fujio Momiyama; Kenichi Ohmori; Shinichi Oku; Junichi Katoh, all of Hino, Japan

[73] Assignee: Hino Jidosha Kogyo Kabushiki Kaisha, Tokyo, Japan

[21] Appl. No.: 694,397

[22] Filed: May 1, 1991

[30] Foreign Application Priority Data

May 7, 1990 [JP] Japan .................. 2-117402

[51] Int. Cl.⁵ .............................................. F16H 1/445
[52] U.S. Cl. ........................................ 475/86; 180/197; 180/248
[58] Field of Search ................. 475/86, 118, 120, 231; 180/197, 248, 249; 192/85 AA, 103 F, 0.058, 0.094

[56] References Cited

U.S. PATENT DOCUMENTS

| | | | |
|---|---|---|---|
| 3,576,241 | 12/1968 | Maurice et al. | 192/85 AA |
| 3,788,166 | 1/1974 | Hart et al. | 475/86 |
| 4,570,509 | 2/1986 | Nighswonger | 475/86 |
| 4,679,463 | 7/1987 | Ozaki et al. | 475/86 |
| 4,681,180 | 7/1987 | Oyama et al. | 180/248 X |
| 4,735,110 | 4/1988 | Altenberg | 180/248 X |
| 4,805,715 | 2/1989 | Deike et al. | 180/197 |
| 4,834,044 | 5/1989 | Maas | 180/197 X |
| 4,921,064 | 5/1990 | Wazaki et al. | 180/197 |
| 4,966,250 | 10/1990 | Imaseki | 475/86 X |
| 4,974,696 | 12/1990 | Miyajima et al. | 475/86 X |
| 5,012,882 | 5/1991 | Oono et al. | 180/197 |

*Primary Examiner*—Dirk Wright
*Attorney, Agent, or Firm*—Staas & Halsey

[57] ABSTRACT

A limited slip differential for a vehicle comprises a friction clutch disposed between a differential gear mechanism and a drive wheel axle, a clutch control cylinder for coupling and decoupling the friction clutch, a normally closed type solenoid valve for charging compressed air to the cylinder from a pressure air source and a normally opened type solenoid valve for discharging compressed air from the cylinder to the air. The normally closed type and normally opened type solenoid valves are operated by a control unit in response to a low μ road start, a low μ road run, a straight run and a brake so as to charge and discharge compressed air to and from the cylinder and thereby to control air pressure in the cylinder. A power device for a vehicle is composed by adding an engine control cylinder disposed in an acceleration control mechanism and an engine control valve for charging and discharging compressed air to the cylinder, and wherein during a low μ road run of the vehicle the engine control valve is operated by the control unit to charge compressed air to the engine control cylinder thereby to cause the engine control cylinder an acceleration return.

15 Claims, 3 Drawing Sheets

LIMITED SLIP DIFFERENTIAL AND POWER DEVICE

BACKGROUND OF THE INVENTION

1. Field of the Invention

This invention relates to a limited slip differential and power device which are used for a motor vehicle, and the power device herein refers to ones constituted by an engine and a power transmission device for transmitting torque generated by the engine to drive wheels.

2. Prior Art Statement

In a motor vehicle, a limited slip differential is used in which a plurality of clutch plates are incorporated between a differential side gear of a differential gear mechanism and a differential case for avoiding slip of one of a pair drive wheels and enhancing starting and running characteristics on a road having a low surface friction coefficient $\mu$, and further for ensuring driving performance during turning.

Thereby, since this kind of limited slip differential was constructed so as to generate a thrust force pushing the side gear by a cam mechanism to induce a differential resistance on the clutch plates and moreover to include a prebiased spring to generate a predetermined friction torque even when the transmission torque was small, stick slip noise was likely to be generated during differential moment which necessitates a special purpose lubricant, further when the clutch plates were worn, the prebias varied.

SUMMARY OF THE INVENTION

It is therefore an object and a problem of the present invention to provide a limited slip differential and a power device which enables to control quickly and accurately a differential resistance generated at the friction clutch to enhance starting characteristic and running characteristic of a motor vehicle on a road (a low $\mu$ road) having a low surface friction coefficient $\mu$, further to enhance straight running characteristic and running stability against external force and still further to enhance running stability of a vehicle during braking.

In connection with the above object and problem, the limited slip differential comprises a friction clutch disposed between a differential case of a differential gear mechanism and a drive wheel axle, a clutch control cylinder disposed in the differential case and for coupling and decoupling the friction clutch by connecting to a pressure air source through a pressure air line, a normally closed type solenoid valve disposed in the pressure air line, a normally opened type solenoid valve disposed in the pressure air line downstream the normally closed solenoid valve and being opened to the air in the normal condition, and a control unit, the input terminals of which are electrically connected to a brake switch, vehicle wheel revolution sensors for right and left front and rear wheels and a pressure sensor for the clutch control cylinder and the output terminals of which are electrically connected to the normally closed type solenoid valve and the normally opened type solenoid valve, and the control unit selectively open and close-controls the normally closed type solenoid valve and the normally opened type solenoid valve into a state where the air pressure of the clutch control cylinder is increased when revolution number of any one of right and left rear wheels exceeds that of the front wheels by a predetermined value during starting on a low $\mu$ road, into a state where the air pressure of the clutch control cylinder is decreased when revolution number of the both right and left rear wheels exceeds that of the front wheels by a predetermined value, into a state where the air pressure of the clutch control cylinder is raised in response to the increase of vehicle speed during straight road running, and further into a state where the air pressure is rendered to zero or minimum during braking so that control of differential action and transmission torque suitable for starting, running on a road having a low surface friction coefficient $\mu$, straight road running and braking, and further, the power device according to the present invention comprises an engine control cylinder disposed in an acceleration control mechanism, an engine control valve for charging and discharging pressure air to the engine control cylinder, and a limited slip differential including a friction clutch disposed between a differential ease of a differential gear mechanism and a drive wheel axle, a clutch control cylinder disposed in the differential case and for coupling and decoupling the friction clutch by connecting to a pressure air source through a pressure air line, a normally closed type solenoid valve disposed in the pressure air line, a normally opened type solenoid valve disposed in the pressure air line downstream the normally closed type solenoid valve and being opened to the air in the normal condition, and a control unit, the input terminals of which are electrically connected to a brake switch, vehicle wheel revolution sensors for right and left front and rear wheels and a pressure sensor of the clutch control cylinder, and the output terminals of which are electrically connected to the engine control valve, the normally closed type solenoid valve and the normally opened type solenoid valve, and the control unit selectively open and close-controls the engine control valve, the normally closed type solenoid valve and the normally opened type solenoid valve into a state where the air pressure of the clutch control cylinder is increased when revolution number of any one of right and left rear wheels exceeds that of the front wheels by a predetermined value during starting on a low $\mu$ road, into a state where the pressure air is charged to the engine control cylinder to cause an acceleration return control in the engine control cylinder when revolution number of the both right and left rear wheels exceeds that of the front wheels by a predetermined value during running on a low $\mu$ road, into a state where the air pressure of the clutch control cylinder is raised in response to the increase of vehicle speed during running on a straight road and into a state where the air pressure in the clutch control cylinder is rendered to zero or minimum during braking so that control of differential action and transmission torque suitable for starting, running on a road surface having a low surface friction coefficient $\mu$, straight road running and braking is obtained.

DESCRIPTION OF THE PREFERRED EMBODIMENT

Hereinbelow, a specified concrete embodiment of a limited slip differential and power device according to the present invention will be described with reference to the accompanying drawings.

Figure 1:
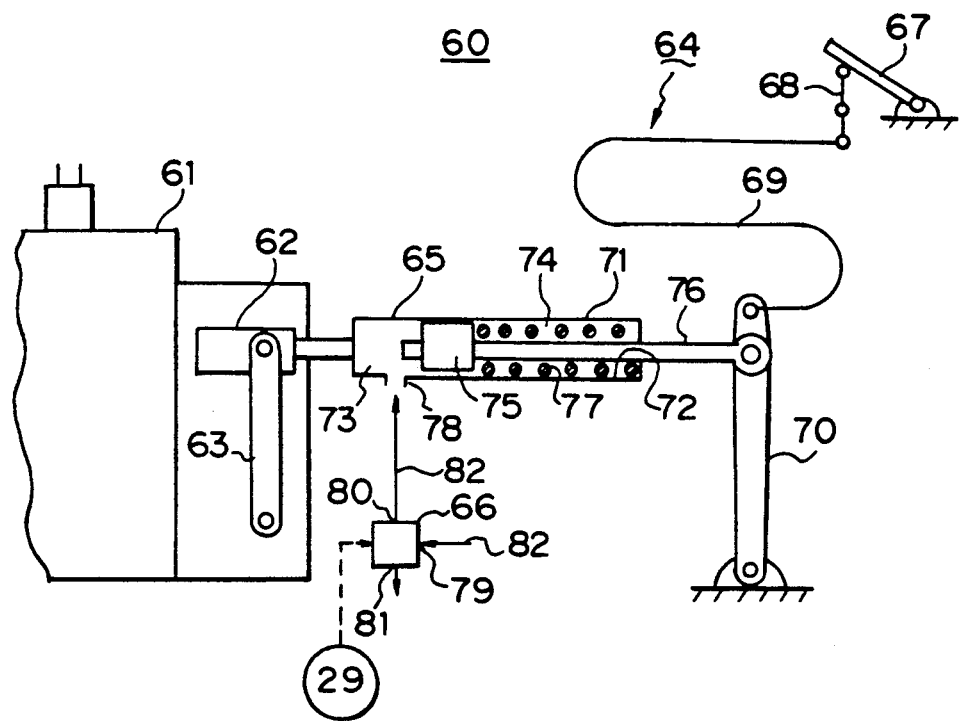
FIG. 1 is a schematic explanatory view of an engine control side in a concrete embodiment of a power device of the present invention applied to a truck which includes a concrete embodiment of a limited slip differential of the present invention.
Figure 2:
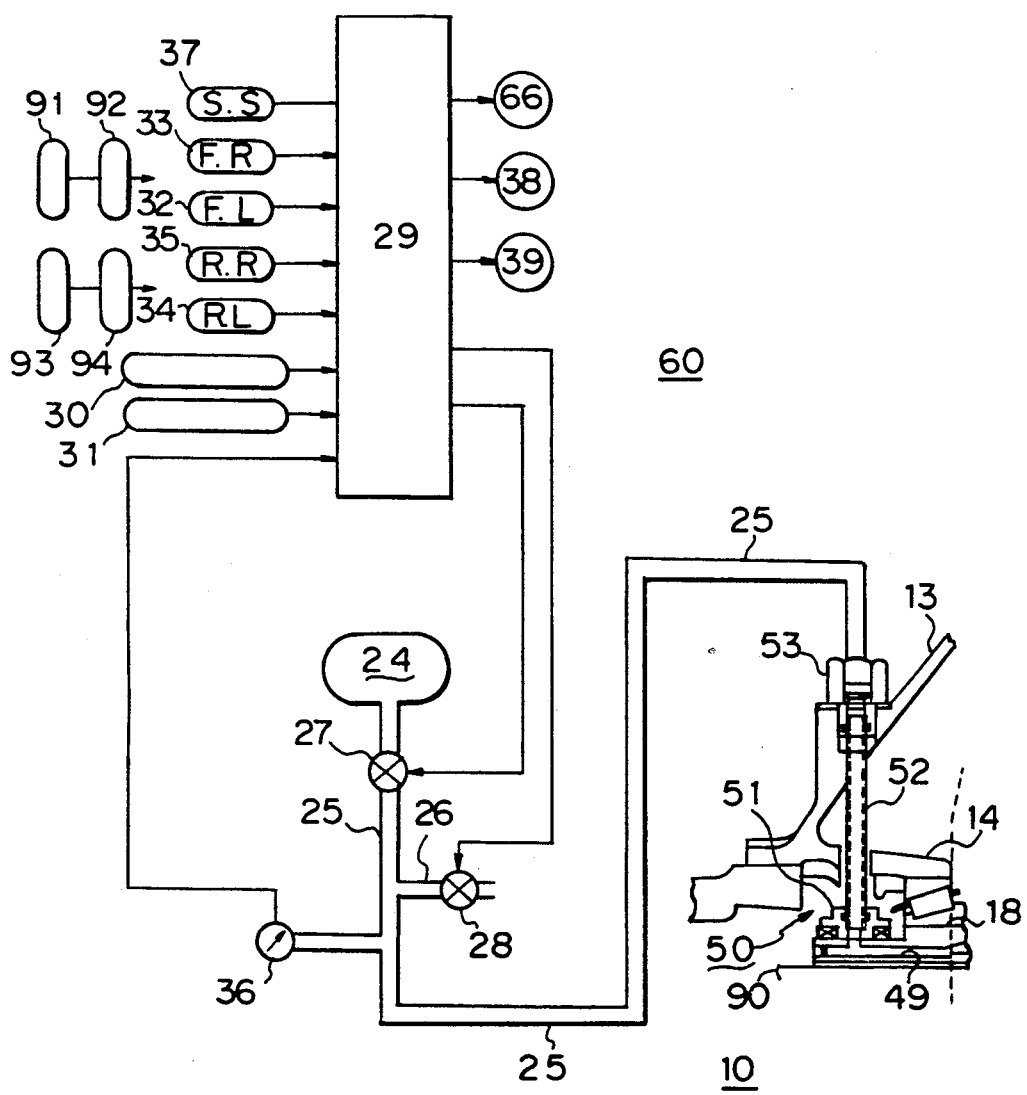
FIG. 2 is a schematic explanatory view of the limited slip differential in the power device shown in FIG. 1.
Figure 3:
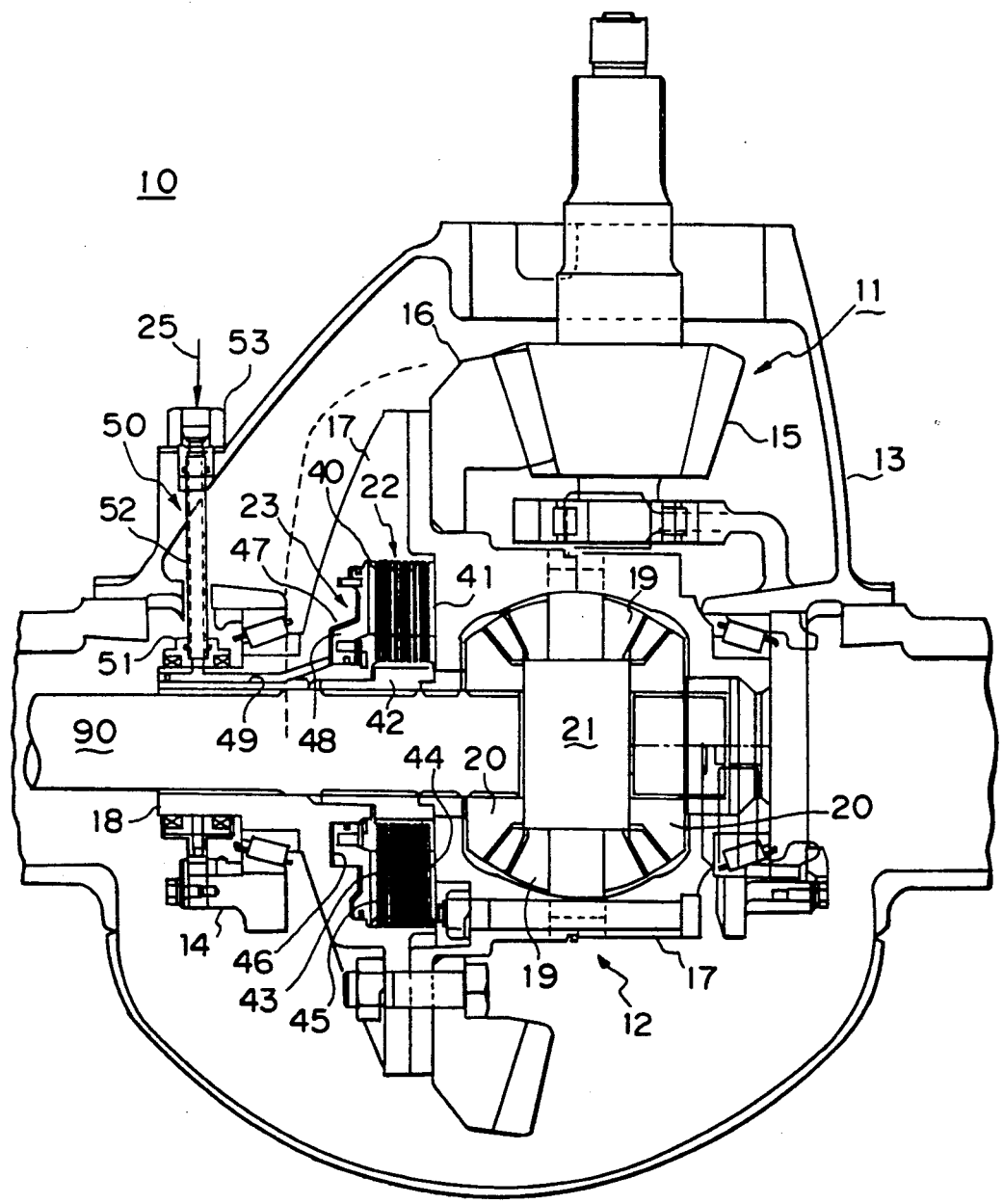
FIG. 3 is a cross-sectional view of a differential gear mechanism side in the limited slip differential shown in FIG. 2.

FIG. 1 through FIG. 3 show a concrete embodiment of a power device 60 according to the present invention applied to a truck including a limited slip differential 10 according to the present invention.

The power device 60 includes a diesel engine (not shown), a power transmission device for transmitting torque generated by the engine to drive wheels, an engine control cylinder 65 disposed in an acceleration control mechanism 64 and an engine control valve 66 for charging and discharging pressure air to the engine control cylinder and is assembled thereby. Of course, the power transmission device includes such as a clutch (not shown), a transmission (not shown), a reduction gear mechanism 11, a limited slip differential 10, a propeller shaft (not shown), a universal joint (not shown) and a slide joint (not shown).

The engine control cylinder 65 includes a cylinder body 71 in which a cylinder bore 72 is provided, a piston which is fitted into the cylinder bore 72 so as to permit slidable reciprocating movement and defines in the cylinder bore 72 a cylinder chamber 73 and a spring chamber 74, a piston rod 76, one end of which is fixedly connected to the piston 75 and the other end of which is constituted to allow insertion and withdrawal from a rod cover of the cylinder body 71 and a return spring 77 disposed in the spring chamber 74, and is disposed in the acceleration control mechanism 64 while rotatably connecting respectively the cylinder body 71 to a control rack 62 of a fuel injection pump of the diesel engine and the piston rod 76 to a fuel control lever 70 of the acceleration control mechanism 64. Of course, the acceleration control mechanism is constituted as usual by connecting to the fuel control lever 70 an acceleration pedal 67, an acceleration pedal lever 68 and an acceleration cable 69.

The engine control valve 66 uses a normally closed type three way controlled solenoid valve and is disposed on a pressure air line 82 connecting an air port 78 opened at the cylinder chamber 73 in the engine control cylinder 65 to an air tank 24. Of course, the engine control valve 66 is designed in such a structure that its pressure port 79 and outlet port 80 are connected to the pressure air line 82 and its discharge port 81 is opened to the air.

The limited slip differential 10 is constructed by incorporating a differential gear mechanism 12 combined with a reduction gear mechanism 11, a friction clutch 22 disposed between a differential case of the differential gear mechanism 12 and drive wheel axle 90, a clutch control cylinder 23 disposed in the differential case 17 and for coupling and decoupling the friction clutch 22 by connecting to the air tank 24 through pressure air line 25, a normally closed type solenoid valve 27 disposed in the pressure air line 25, a normally opened type solenoid valve 28 disposed in the pressure air line 25 downstream the normally closed type solenoid valve 27 and being opened to the air in the normal condition, and a control unit 29, the input terminals of which are electrically connected to a manual switch 30 of the truck, a brake switch 31 of the truck, vehicle wheel revolution sensors 32, 33, 34 and 35 disposed at right and left front and rear wheels of the truck, a pressure sensor 36 of the clutch control cylinder 23 and a vehicle speed sensor 37, and the output terminals of which are electrically connected to the engine control valve 66, the normally closed type solenoid valve 27 and the normally opened type solenoid valve 28.

The friction clutch 22 is assembled by incorporating a bore 40 formed in the differential case 17, a clutch ring 42 coupled to the drive wheel axle 90 through splines thereof to form the bore 40 of the differential case 17 into a ring chamber 41, a multiplicity of external gear clutch plates 43 and internal gear clutch plates 44 arranged alternatively in the ring chamber 41, and a pressure ring 45 pressing the external gear and internal gear clutch plates 43 and 44. Of course, the friction clutch 22 is assembled in such a manner that the external gear clutch plates 43 are coupled to the differential case 17 through splines thereof and the internal gear clutch plates 44 to the clutch ring 42 through splines thereof respectively and transmission torque of the drive wheel axle 90 and the other drive wheel axle is controllable.

The clutch control cylinder 23 is assembled in the differential case 17 and presses and separates the external gear clutch plates and the internal gear clutch plates 43 and 44 each other through the pressure ring 45 to cause the friction clutch 22 a clutch coupling and decoupling operation.

The clutch control cylinder 23 is realized by an inner diameter guiding type structure which includes a ring cylinder 46 formed in the differential case 17 and opened to the ring chamber 41, and a ring piston 48 facing to the pressure ring 45, fitted to the ring cylinder 46 so as to allow slidable reciprocating movement and forming a cylinder chamber 47 in the ring cylinder 46, and is assembled in such a manner that an air port 49 opened to the cylinder chamber 47 is connected to the pressure air line 25 through a pressure air coupling 50 so that the pressure air is charged from the air tank 24 to the cylinder chamber 47 and discharged from the cylinder chamber 47 to the air.

Of course, the pressure air coupling 50 is assembled together with a sealed slip ring 51 fitted onto a boss 18 of the differential case 17 so as to permit relative rotational movement thereto and fitted into a ring gear boss 14 of a differential carrier 13 so as to prevent rotation thereto, and an air lead pipe 52 connecting the sealed slip ring 51 to the pressure air line 25 outside the differential carrier 13, and the air lead pipe 52 comprises a pipe connector 53 and is connected to the pressure air passage namely the pressure air line 25 through the pipe connector 53.

The normally closed type solenoid valve 27 is a two way controlled solenoid valve and its solenoid coil (not shown) is connected to the output terminal of the control unit 29.

The normally opened type solenoid valve 28 is a two way controlled solenoid valve and is disposed in a branched line 26 branched from the pressure air line 25 downstream the solenoid valve 27, and its solenoid coil (not shown) is electrically connected to the output terminal of the control unit 29.

The control unit 29 is constituted so as to control current flowing through the engine control valve 66, normally closed type solenoid valve 27 and the normally opened type solenoid valve 28 in such a manner that with regard to any one of right and left wheels 91, 92, 93 and 94 when revolution number of the rear wheels 93 and 94 exceeds that of the front wheels 91 and 92 by a predetermined value during starting of the truck on a road having a low surface friction coefficient $\mu$, the air pressure in clutch control cylinder 23 is increased, with regard to the both right and left wheels 91, 92, 93 and 94 when revolution number of the rear wheels 93 and 94 exceeds that of the front wheels 91 and 92 by a predetermined value during running of the truck on a road having a low surface friction coefficient $\mu$, the pressure air is supplied to the engine control cylinder 65 to cause the engine control cylinder 65 an acceleration return control, when the truck is running straight on a normal paved road, the pressure air in the clutch control cylinder 23 is raised in response to the increase of vehicle speed, and when the truck is braked, the pressure air in the clutch control cylinder 23 is rendered to zero or to minimum, and the input terminals of the control unit 29 are electrically connected to a manual switch 30, a brake switch 31, vehicle revolution sensors 32, 33, 34 and 35 of right and left front wheels 91 and 92 and rear wheels 93 and 94, a pressure sensor 36 and a vehicle speed sensor 37 and the output terminals thereof are electrically connected to the solenoid coils of the engine control valve 66, the normally closed type solenoid valve 27 and the normally opened type solenoid valve 28. Of course, the pressure sensor 36 is disposed in the pressure air line 25 and senses the pressure in the clutch control cylinder 23, further, the output terminals of the control unit 29 are electrically connected to an operation indicating lamp 38 and a failure indicating lamp 39.

Further, in this power transmission device, the reduction gear mechanism 11 includes a drive pinion 15 and a ring gear 16 which are engaged each other in the differential carrier 13, and the differential gear mechanism 12 includes four differential pinions 19, 19 and a pair of differential side gears 20, 20 which are disposed in the differential case 17 in association with the reduction gear mechanism 11. Of course, the differential pinions 19, 19 are fitted into the both ends of a spider 21 so as to permit rotational movement, on the other hand, the differential side gears 20, 20 are connected respectively to the drive wheel axle 90 and the other drive wheel axle through splines thereof and engage with the differential pinions 19, 19.

Hereinbelow, operation of the power device 60 explained above is explained in association with running conditions of the truck.

At first, when a truck starts on a road having a low surface friction coefficient $\mu$, in that, during starting on a low $\mu$ road, the manual switch 30 is turned on beforehand and the control unit 29 compares input electrical signals representing respectively the revolution numbers of right and left front wheels 91, 92 and rear wheels 93, 94 which are detected respectively by the vehicle wheel revolution sensors 32, 33, 34 and 35 and when in one of right and left wheels 91, 92, 93 and 94 revolution number of the rear wheels 93, 94 exceeds that of the front wheels by a predetermined value, a current is applied to the solenoid coils of the normally closed type and normally opened type solenoid valves 27 and 28 to close the normally opened type solenoid valve 28 and subsequently to open the normally closed type solenoid valve 27.

Thereby, since immediately after the normally opened type solenoid valve 27 is opened, pressure air is supplied from the air tank 24 to the clutch control cylinder, the ring piston 48 presses the external gear and internal gear clutch plates 43 and 44 through the pressure ring 45 and in association therewith the friction clutch 22 generates torque limiting differential of the differential gear mechanism 12.

When the friction clutch 22 generates a differential limiting torque thus explained, the differential case 17 and the drive wheel axle 90 operate so as to match their revolution numbers by means of the friction clutch 22 and at the same time differential of the differential gear mechanism 12 is limited by the differential limiting torque thereby the revolution number of the other drive wheel axle is matched with that of the drive wheel axle 90.

Thus, the transmission torque of the drive wheel axle 90 and the other drive wheel axle is limited.

When the truck is running on a low $\mu$ road, the control unit 29 compares input electrical signals representing respectively the revolution numbers of right and left front wheels 91, 92 and rear wheels 93, 94 which are detected respectively by the vehicle wheel revolution sensors 32, 33, 34 and 35 and when in both right and left wheels 91, 92, 93 and 94 revolution number of the rear wheels exceeds that of the front wheels by a predetermined value, a current is applied through the solenoid coil of the engine control valve 66 to open the engine control valve 66.

Since the engine control valve 66 is opened as explained, pressure air is charged from the air tank 24 to the engine control cylinder 65 and the engine control cylinder 65 is prolonged to return the control rack 62.

In this instance, as will be understood from the above, the control unit 29 causes the engine control cylinder 65 to perform acceleration return operation.

When the engine control cylinder 65 is controlled by the control unit 29 to perform the acceleration return operation as explained above, the control unit 29 subsequently interrupts the current flowing through the normally closed type and normally opened type solenoid valves 27 and 28 to close the normally closed type solenoid valve 27 and to open the normally opened type solenoid valve 28.

Since the normally closed type solenoid valve 27 is closed and the normally opened type solenoid valve 28 is opened, the air pressure in the clutch control cylinder 23 is reduced due to discharge thereof from the normally opened type solenoid valve 28 to the air, thereby, the pressing force of the ring piston 48 to the external gear and internal gear clutch plates 43 and 44 through the pressure ring 45 is decreased, as a result, the differential limiting torque generated on the friction clutch 22 is reduced, and accordingly, the transmission torque of the driving wheel axle 90 and the other driving wheel axle is controlled.

When the air pressure in the clutch control cylinder 23 is reduced down to a value suitable for the specific low $\mu$ road, the reduced air pressure is detected by the pressure sensor 36, converted into an electrical signal and inputted into the control unit 29, thereby the control unit 29 flows a current through the solenoid coil of the normally opened solenoid valve 28 to close the normally opened type solenoid valve 28.

As a result, slip of the drive wheel is avoided before its occurrence and the truck is ensured running smoothly.

When the truck is running straight on an ordinary paved road, the control unit 29 is inputted a running speed of the truck in a from of electrical signal detected by the vehicle speed sensor 37, processes thereof to determine currents to be flown through the solenoid coil of the normally closed type and the normally opened type solenoid valves 27 and 28 and flows the currents therethrough so that the normally opened type solenoid valve 28 is closed, and immediately thereafter the normally closed type solenoid valve 27 is opened.

Since immediately after the normally opened type solenoid valve 28 is closed, the normally closed type solenoid valve 27 is opened as explained above, the pressure air is supplied from the air tank 24 to the clutch control cylinder 23, the ring piston 48 presses the external gear and internal gear clutch plates 43, 44 through the pressure ring 45 accordingly, the friction clutch 22 generates torque limiting the differential of the differential gear mechanism 12.

When the friction clutch 22 generates the differential limiting torque, the differential case 17 and the drive wheel axle 90 are operated so as to match their revolution numbers each other through the friction clutch 22 and at the same time differential in the differential gear mechanism 12 is limited by the differential limiting torque, thereby the revolution number of the other drive wheel axle is matched to that of the drive wheel axle 90.

Thus, the transmission torque of the drive wheel axle 90 and the other drive wheel axle is limited.

Further, when the air pressure in the clutch control cylinder 23 is raised in response to the vehicle speed, the raised air pressure is detected by the pressure sensor 36, converted therein into an electrical signal and inputted to the control unit 29, thereby the control unit 29 interrupts the current flowing through the solenoid coil of the normally closed type solenoid valve 27 to close the normally closed type solenoid valve 27. Of course, the air pressure in the clutch control cylinder 23 is raised in response to the vehicle speed to limit the differential action.

Accordingly, with regard to this truck the straight running characteristic is enhanced and stabilized, further the stable running characteristic against external force is enhanced.

When the truck is braked, since the brake switch 31 is turned on, the control unit 29 interrupts the current flowing through the solenoid coil of the normally closed type and normally opened type solenoid valves 27 and 28, closes the normally closed type solenoid valve 27 and immediately thereafter, opens the normally opened type solenoid valve 28.

Since immediately after the normally closed type solenoid valve 27 is closed, the normally opened type solenoid valve 28 is opened as explained above, the pressure air in the clutch control cylinder 23 is discharge through the normally opened type solenoid valve 28 to the air and is rendered zero or minimum, thereby the pressing force of the ring piston 48 on the external gear and internal gear clutch plates 43 and 44 through the pressure ring 45 is rendered zero or reduced minimum, as a result, the differential limiting torque generated on the friction clutch 22 is rendered zero or minimum, and therefore the transmission torque of the drive wheel axle 90 and the other drive wheel axle is controlled.

As a result, the performance of the brake of the truck is enhanced.

Since the above explained power device 60 includes the engine control cylinder 65 and the engine control valve 66, when the truck runs on a low $\mu$ road, the control unit 29 causes the engine control cylinder 65 the acceleration return control, however, in a power device which omits the engine control cylinder 65 and the engine control valve 66, the acceleration return control is omitted and with regard to the both right and left wheels 91, 92, 93 and 94 when revolution number of the rear wheels 93 and 94 exceeds that of the front wheels by a predetermined value, the control unit 29 open and close-controls the normally closed type and the normally opened type solenoid valves 27 and 28 into a state where the air pressure in the clutch control cylinder 23 is decreased.

As will be understood from the above description, the limited slip differential according to the present invention comprises a friction clutch disposed between a differential case in a differential gear mechanism and a drive wheel axle, a clutch control cylinder disposed in the differential case and for coupling and decoupling the friction clutch by connecting thereof to a pressure air source through a pressure air line, a normally closed type solenoid valve disposed in the pressure air line, a normally opened type solenoid valve disposed in the pressure air line downstream the normally closed type solenoid valve and being opened to the air in the normal condition, and a control unit, the input terminals of which are electrically connected to a brake switch, vehicle wheel revolution sensors of right and left front and rear wheels, and a pressure sensor of the clutch control cylinder and the output terminals of which are electrically connected to the normally closed type and the normally opened type solenoid valves, and the control unit selectively open and close-controls the normally closed type and the normally opened type solenoid valves into a state where when with regard to any one of right and left wheels, revolution number of the rear wheels exceeds that of the front wheels by a predetermined value during starting on a low $\mu$ road, the air pressure in the clutch control cylinder is increased, into a state where when with regard to the both right and left wheels revolution number of the rear wheels exceeds that of the front wheels by a predetermined value during running on a low $\mu$ road, air pressure in the clutch control cylinder is decreased, into a state where when running straight, the air pressure in the clutch control cylinder is raised in response to the increase of vehicle speed, and into a state where when braking the air pressure in the clutch control cylinder is rendered zero or minimum, so that a differential action limitation and a transmission torque suitable for starting, running on a road having a low surface friction coefficient $\mu$, straight running and braking of a vehicle are achieved. Further, the power device according to the present invention comprises an engine control cylinder disposed in an air acceleration control mechanism, an engine control valve for charging and discharging pressure air to the engine control cylinder, and limited slip differential provided with a friction clutch disposed between a differential case in a differential gear mechanism and a drive wheel axle, a clutch control cylinder disposed in the differential case and for coupling and decoupling the friction clutch by connection thereof to a pressure air source through a pressure air line, a normally closed type solenoid valve disposed in the pressure air line, a normally opened type solenoid valve disposed in the pressure air line downstream the normally closed type solenoid valve and being opened to the air in the normal condition, and a control unit, the input terminals of which are electrically connected to a brake switch, vehicle wheel revolution sensors of right and left front and rear wheels, and a pressure sensor of the clutch control cylinder and the output terminals of which are electrically connected to the engine control valve, the normally closed type solenoid valve and the normally opened type solenoid valve, and the control unit is selectively open and close-controls the engine control valve, the normally closed type solenoid valve and the normally opened type solenoid valve into a state where the air pressure in the clutch control cylinder is increased when with regard to any one of right and left wheels revolution number of the rear wheel exceeds that of the front wheel by a predetermined value during starting on a low μ road, into a state where a pressure air is charged into the engine control cylinder to cause the engine control cylinder an acceleration return control when with regard to both right and left wheels revolution number of the rear wheels exceeds that of the front wheels by a predetermined value during running on a low μ road, into a state where the air pressure in the clutch control cylinder is raised in response to the increase of vehicle speed when running on a straight road, and into a state where the air pressure in the clutch control cylinder is rendered zero or minimum when braking so that limitation of differential action and transmission torque suitable for starting, running on a road having a low surface friction coefficient μ, straight running and braking are obtained, accordingly with the limited slip differential and the power device of the present invention when a motor vehicle starts on a low μ road one wheel slip of the drive wheels is avoided and the starting characteristic is enhanced, further, when a motor vehicle is running on a low road slip of the drive wheels is avoided before its occurrence and the running characteristic is enhanced, still further, when a motor vehicle is running on a straight road differential action is limited in response to increase of vehicle speed and the straight running characteristic and running stability against external force are enhanced, moreover, when a motor vehicle is braking the transmission torque of the drive wheel axle is rendered zero or minimum to enhance the braking performance, thereby the running stability is enhanced, accordingly the present invention is applicable to various kinds of vehicles, in particular the present invention is very useful for large scaled motor vehicles such as trucks and buses.

From the above embodiment of the present invention described with reference to the drawings, persons having ordinary skill in the technical field pertaining the present invention can easily replace the present invention for several modifications in which the contents of the present invention are indispensable for achieving the tasks of the present invention and completing the invention and which is the nature of the present invention, is originated from the technical essence of the present invention and is objectively recognized such is inherent.

What is claimed is:

1. A limited slip differential for a vehicle comprising:
    a friction clutch disposed between a differential case of a differential gear mechanism and a drive wheel axle;
    a clutch control cylinder disposed in the differential case and for coupling and decoupling said friction clutch by connecting to a pressure air source through a pressure air line;
    a normally closed type solenoid valve disposed in the pressure air line;
    a normally opened type solenoid valve disposed in the pressure air line downstream of said normally closed type solenoid valve and being opened to the air in the normal condition; and
    a control unit, having input terminals electrically connected to vehicle wheel revolution sensors for right and left front and rear wheels and a pressure sensor for said clutch control cylinder, and having output terminals electrically connected to said normally closed type solenoid valve and said normally opened type solenoid valve, which selectively open and close, said control unit controlling said normally closed type solenoid valve and said normally opened type solenoid valve into a state where the air pressure of said clutch control cylinder is decreased when the number of revolutions of both the right and left rear wheels exceeds that of the front wheels by a predetermined value during running on a low μ road, into a state where the air pressure of said clutch control cylinder is raised in accordance with the increase of vehicle speed during running on a straight road.

2. A limited slip differential for a vehicle according to claim 1, wherein said friction clutch includes:
    a bore formed in the differential case;
    a clutch ring coupled to the drive wheel axle through splines thereof to form the bore of the differential case into a ring chamber;
    a multiplicity of external gear clutch plates and internal gear clutch plates arranged alternatively in the ring chamber; and
    a pressure ring pressing said multiplicity of external gear and internal gear clutch plates, said multiplicity of external gear clutch plates coupled to the differential case through splines thereof and said multiplicity of internal gear clutch plates coupled to said clutch ring through splines thereof.

3. A limited slip differential for a vehicle according to claim 1, wherein said clutch control air cylinder includes:
    a ring cylinder formed in the differential case and opened to the ring chamber; and
    a ring piston facing said pressure ring, fitted to said ring cylinder to allow slidable reciprocating movement and forming a cylinder chamber in said ring cylinder.

4. A limited slip differential for a vehicle according to claim 3, wherein said clutch control air cylinder further includes a pressure air coupling which connects the cylinder chamber to a pressure air source through a pressure air line.

5. A limited slip differential for a vehicle according to claim 4, wherein said pressure air coupling includes:
    a sealed sip ring fitted onto a boss of the differential case so as to permit relative rotational movement thereto and fitted into a ring gear boss of a differential carrier to prevent rotation thereto; and
    an air lead pipe connecting said sealed slip ring to the pressure air line.

6. A limited slip differential for a vehicle, comprising:
    an acceleration control mechanism;
    an engine control cylinder disposed in said acceleration control mechanism;
    an engine control valve for charging and discharging pressure air to and from said engine control cylinder; and a friction clutch disposed between a differential case of a differential gear mechanism and a drive wheel axle;

a clutch control cylinder disposed in the differential case for coupling and decoupling said friction clutch by connecting to a pressure air source through a pressure air line;

a normally closed type solenoid valve disposed in the pressure air line;

a normally opened type solenoid valve disposed in the pressure air line downstream from said normally opened type solenoid valve and being opened to the air in the normal condition; and a control unit having input terminals electrically connected to vehicle wheel revolution sensors for right and left front and rear wheels and a pressure sensor for said clutch control cylinder, and having output terminals electrically connected to said normally closed type solenoid valve and said normally opened type solenoid valve, which selectively open and close, said control unit controlling said normally closed type solenoid valve and said normally opened type solenoid valve into a state where the air pressure of said clutch control cylinder is decreased when the number of revolutions of both the right and left rear wheels exceeds that of the front wheels by a predetermined value during running on a low $\mu$ road, and into a state where the air pressure in said clutch control cylinder is raised in response to the increase of vehicle speed during running on a straight road.

7. A limited slip differential for a vehicle according to claim 6, wherein said engine control cylinder includes:

a cylinder body in which a cylinder bore is provided;

a piston fitted into the cylinder bore to permit slidable reciprocating movement and define in the cylinder bore a cylinder chamber and a spring chamber;

a piston rod, one end of which is fixedly connected to said piston and the other end of which allows insertion and withdrawal at a rod cover of said cylinder body; and a return spring disposed in the spring chamber, and said engine control cylinder is connected between a control rack of a fuel injection pump of a diesel engine and a fuel control lever of said acceleration control mechanism.

8. A limited slip differential for a vehicle according to claim 7, wherein in said engine control cylinder one end of said piston rod is fixedly connected to said piston in the spring chamber, said cylinder body is connected to the control rack and said piston rod is rotatably connected to the fuel control lever.

9. A limited slip differential for a vehicle according to claim 8, wherein said engine control valve is a normally closed type three way controlled solenoid valve and is disposed in a pressure air line connecting the cylinder chamber of said engine control cylinder to the pressure air source.

10. A limited slip differential for a vehicle according to claim 6, wherein said clutch control cylinder includes:

a ring cylinder formed in the differential case and opened to the ring chamber; and a ring piston facing the pressure ring, fitted to the ring cylinder to allow slidable reciprocating movement and forming a cylinder chamber in the ring cylinder.

11. A limited slip differential for a vehicle according to claim 10, wherein said clutch control cylinder further includes a pressure air coupling which connects the cylinder chamber to the pressure air source through a pressure air line.

12. A limited slip differential for a vehicle according to claim 11, wherein said pressure air coupling includes:

a sealed slip ring fitted into a boss of the differential case to permit relative rotational movement thereto which is stopped by a ring gear boss in a differential carrier supporting the differential; and an air lead pipe connecting said sealed slip ring to the pressure air line.

13. A limited slip differential for a vehicle according to claim 6, wherein said engine control valve is a normally closed type three way controlled solenoid valve and is disposed in a pressure air line connecting the cylinder chamber of said engine control cylinder to the pressure air source.

14. A limited slip differential for a vehicle according to claim 7, wherein said engine control valve is a normally closed type three way controlled solenoid valve and is disposed in a pressure air line connecting the cylinder chamber of said engine control cylinder to the pressure air source.

15. A limited slip differential for a vehicle comprising:

a friction clutch disposed between a differential case of a differential gear mechanism and a drive wheel axle;

a clutch control cylinder disposed in said differential case and for coupling and decoupling said friction clutch by connecting to a pressure air source through a pressure air line;

a normally closed type solenoid valve disposed in said pressure air line;

a normally opened type solenoid valve disposed in said pressure air line downstream of said normally closed type solenoid valve and being opened to the air in the normal condition; and a control unit having input terminals electrically connected to a brake switch, vehicle wheel revolution sensors for said clutch control cylinder, and having output terminals electrically connected to said normally closed type solenoid valve and said normally opened type solenoid valve, which selectively open and close, and said control unit controlling said normally closed type solenoid valve and said normally opened type solenoid valve into a state where the air pressure in said clutch control cylinder is increased when the number of revolutions of any one of right and left rear wheels exceeds that of front wheels by a predetermined value during starting on a low $\mu$ road, into a state where the air pressure of said clutch control cylinder is decreased when the number of revolutions of both said right and left rear wheels exceeds that of said front wheels by a predetermined value during running on a low $\mu$ road, into a state where the air pressure of said clutch control cylinder is raise din accordance with an increase of vehicle speed during running on a straight road, and into a state where the air pressure of said clutch control cylinder is rendered zero or minimum during braking.

* * * * *

UNITED STATES PATENT AND TRADEMARK OFFICE
CERTIFICATE OF CORRECTION

PATENT NO. :   5,145,466
DATED      :   SEPTEMBER 8, 1992
INVENTOR(S) :  FUJIO MOMIYAMA ET AL.

It is certified that error appears in the above-identified patent and that said Letters Patent is hereby corrected as shown below:

Col. 10, line 56, "sip" should be --slip--.

Col. 12, line 62, "raise din" should be --raised in--.

Signed and Sealed this

Twenty-first Day of September, 1993

Attest:

BRUCE LEHMAN

*Attesting Officer*    *Commissioner of Patents and Trademarks*